United States Patent
Suzuki et al.

(10) Patent No.: US 9,692,072 B2
(45) Date of Patent: Jun. 27, 2017

(54) ANION EXCHANGE ELECTROLYTE MEMBRANE, MEMBRANE-ELECTRODE ASSEMBLY FOR FUEL CELL INCLUDING THE SAME, AND FUEL CELL INCLUDING THE SAME

(71) Applicant: NITTO DENKO CORPORATION, Ibaraki-shi, Osaka (JP)

(72) Inventors: Takashi Suzuki, Ibaraki (JP); Mizuki Yamamoto, Ibaraki (JP); Hiroyuki Nishii, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/306,621

(22) PCT Filed: Jun. 3, 2015

(86) PCT No.: PCT/JP2015/002820
§ 371 (c)(1),
(2) Date: Oct. 25, 2016

(87) PCT Pub. No.: WO2015/190075
PCT Pub. Date: Dec. 17, 2015

(65) Prior Publication Data
US 2017/0047604 A1    Feb. 16, 2017

(30) Foreign Application Priority Data
Jun. 13, 2014  (JP) .................................. 2014-122475

(51) Int. Cl.
*H01M 8/10*    (2016.01)
*H01M 8/02*    (2016.01)
(Continued)

(52) U.S. Cl.
CPC ........... *H01M 8/1025* (2013.01); *B01J 41/14* (2013.01); *C08F 261/04* (2013.01); *C08J 5/22* (2013.01);
(Continued)

(58) Field of Classification Search
CPC ........ H01M 8/1025; H01M 8/10; H01M 8/02; H01M 8/1039; H01M 2008/1095;
(Continued)

(56) References Cited

U.S. PATENT DOCUMENTS

2011/0281197 A1* 11/2011 Daikoku ............... C08F 226/04
                                                             429/480
2015/0010848 A1*  1/2015 Suzuki ................ H01M 8/1023
                                                             429/492

FOREIGN PATENT DOCUMENTS

JP    2007335119        12/2007
JP    2007335119 A  *   12/2007
(Continued)

OTHER PUBLICATIONS

International Search Report for application No. PCT/JP2015/002820, dated Sep. 8, 2015, 5 pages including English translation.

*Primary Examiner* — Michael M Bernshteyn
(74) *Attorney, Agent, or Firm* — Hamre, Schumann, Mueller & Larson, P.C.

(57) ABSTRACT

Disclosed is an anion exchange electrolyte membrane including: a base polymer having a polar group; and a graft chain having a specific structural unit. The graft chain is, for example, a polymer chain that is formed from diallyldimethylammonium chloride as a monomer.

6 Claims, 2 Drawing Sheets

(51) Int. Cl.
  *C08J 5/22*      (2006.01)
  *C08F 261/04*    (2006.01)
  *H01B 1/06*      (2006.01)
  *H01B 13/00*     (2006.01)
  *H01M 8/1025*    (2016.01)
  *B01J 41/14*     (2006.01)
  *H01B 1/12*      (2006.01)
  *H01M 8/1039*    (2016.01)
  *H01M 8/1018*    (2016.01)

(52) U.S. Cl.
  CPC ............... *H01B 1/06* (2013.01); *H01B 1/122* (2013.01); *H01B 13/00* (2013.01); *H01M 8/02* (2013.01); *H01M 8/10* (2013.01); *H01M 8/1039* (2013.01); *H01M 2008/1095* (2013.01)

(58) Field of Classification Search
  CPC . C08J 5/22; C08F 261/04; H01B 1/06; H01B 1/122; H01B 13/00; B01J 41/14
  USPC ......................................................... 521/27
  See application file for complete search history.

(56) References Cited

FOREIGN PATENT DOCUMENTS

| | | | |
|---|---|---|---|
| JP | 2008204647 |   | 9/2008 |
| JP | 2008204647 A | * | 9/2008 |
| JP | 2010516853 |   | 5/2010 |
| JP | 2013189595 |   | 9/2013 |
| WO | 2008090351 |   | 7/2008 |
| WO | 2010055889 |   | 5/2010 |

* cited by examiner

ANION EXCHANGE ELECTROLYTE MEMBRANE, MEMBRANE-ELECTRODE ASSEMBLY FOR FUEL CELL INCLUDING THE SAME, AND FUEL CELL INCLUDING THE SAME

TECHNICAL FIELD

The present invention relates to an anion exchange electrolyte membrane, a membrane-electrode assembly for a fuel cell including the membrane, and a fuel cell including the assembly.

BACKGROUND ART

Polymer electrolyte fuel cells have the advantage of being operable in the ordinary temperature range and are expected to be used in a wide variety of applications. In particular, anion exchange membrane fuel cells have the following advantages: they can be produced at low cost because there is no particular need to use platinum catalysts therein; and their size can be reduced because liquid fuels can be used therein. An anion exchange membrane fuel cell includes an anode, a cathode, and a separator membrane disposed between the anode and the cathode, and an anion exchange electrolyte membrane is used as the separator membrane. Electrolyte membranes having graft chains have been known as such anion exchange electrolyte membranes (for example, Patent Literature 1).

The use of liquid fuels such as alcohols and hydrazine hydrates as fuels for anion exchange membrane fuel cells has been studied because such liquid fuels are easier to handle and more contributing to the size reduction of systems than hydrogen. In particular, the use of hydrazine hydrates as liquid fuels has been intensively studied because hydrazine hydrates have high reactivity and produce no carbon dioxide through the process of power generation. In an anion exchange membrane fuel cell using such a liquid fuel, ion conducting species are hydroxide ions, and therefore an electrolyte membrane is used in an alkaline atmosphere.

CITATION LIST

Patent Literature

Patent Literature 1: JP 2010-516853 T

SUMMARY OF INVENTION

Technical Problem

Generally, an anion exchange electrolyte membrane contains a quaternary ammonium group as an anion exchange group. In view of its reactivity, for example, a quaternary ammonium group is often formed by a reaction between a halogenomethylphenyl group and a trialkylamine. In this case, the quaternary ammonium group has a benzyltrialkyl ammonium structure. However, the benzyltrialkyl ammonium structure may be decomposed by a reaction such as hydroxide ion ($OH^-$)-assisted nucleophilic substitution reaction in an alkaline atmosphere.

It is therefore an object of the present invention to provide an anion exchange electrolyte membrane containing a quaternary ammonium group that is more resistant to decomposition in an alkaline atmosphere and thus having improved alkali resistance. It is another object of the present invention to provide a membrane-electrode assembly (MEA) for an anion exchange membrane fuel cell, including this electrolyte membrane having such an advantageous feature. It is still another object of the present invention to provide an anion exchange membrane fuel cell including this MEA having such an advantageous feature.

Solution to Problem

The present inventors have studied anion exchange electrolyte membranes including a quaternary ammonium group structure and having improved alkali resistance. As a result of intensive studies, the present inventors have found that an anion exchange electrolyte membrane described below can achieve the objects of the present invention.

That is, the present invention provides an anion exchange electrolyte membrane including: a base polymer having a polar group; and a graft chain having a structural unit represented by the following formula (1) or (2):

In these formulae, $R^1$ to $R^6$ are each independently a hydrogen atom or an alkyl group having 1 to 8 carbon atoms, a structure $A^1$ that forms a ring structure together with a nitrogen atom bonded thereto is a saturated carbon chain having 3 to 7 carbon atoms or a structure in which at least one of the carbon atoms of the saturated carbon chain is substituted by a hetero atom, and $X^1$ and $X^2$ are each independently a halide ion, a hydroxide ion, or an organic or inorganic acid anion.

In another aspect, the present invention provides a MEA for an anion exchange membrane fuel cell, including the anion exchange electrolyte membrane of the present invention.

In still another aspect, the present invention provides an anion exchange membrane fuel cell including the MEA for an anion exchange membrane fuel cell of the present invention.

Advantageous Effects of Invention

According to the present invention, it is possible to obtain an anion exchange electrolyte membrane having good alkali resistance. It is also possible to obtain a MEA including this anion exchange electrolyte membrane having such an advantageous feature. It is further possible to obtain an anion exchange membrane fuel cell including this MEA having such an advantageous feature.

DESCRIPTION OF EMBODIMENTS

The following description of exemplary embodiments of the present invention is provided for illustration purpose only and not for the purpose of limiting the invention to the following embodiments.

In the following description, a polymerizable monomer represented by the formula (9) or (10) may be referred to as a "graft monomer (M)".

In these formulae, $R^1$ to $R^6$ are each independently a hydrogen atom or an alkyl group having 1 to 8 carbon atoms. Preferably, $R^1$, $R^2$, $R^5$, and $R^6$ are each independently a hydrogen atom or an alkyl group having 1 to 4 carbon atoms. Preferably, $R^3$ and $R^4$ are each independently an alkyl group having 1 to 4 carbon atoms.

The structure $A^1$ that forms a ring structure together with a nitrogen atom bonded thereto is a saturated carbon chain having 3 to 7 carbon atoms or a structure in which at least one of the carbon atoms of the saturated carbon chain is substituted by a hetero atom. Preferably, the structure $A^1$ is a saturated carbon chain having 3 to 5 carbon atoms or a structure in which at least one of the carbon atoms of the saturated carbon chain is substituted by a hetero atom. Examples of the hetero atom include a nitrogen atom and an oxygen atom.

A counter anion is usually subjected to ion exchange with another anion before use. Therefore, $X^7$ and $X^8$ are not particularly limited unless it is difficult to perform ion exchange, and known counter anions can be used. For example, $X^7$ and $X^8$ are each independently a halide ion, a hydroxide ion, or an organic or inorganic acid anion. Since a counter anion for use is typically a hydroxide ion, $X^7$ and $X^8$ are each preferably a hydroxide ion. In view of the storage stability of anion exchange groups, $X^7$ and $X^8$ are each preferably a halide ion, or an organic or inorganic acid anion. Examples of the halide ion include a fluoride ion, a chloride ion, a bromide ion, and an iodide ion. In view of good ion exchangeability, the halide ion is preferably a fluoride ion, a chloride ion, or a bromide ion. The organic acid anion is preferably a bis(trifluoromethanesulfonyl)imide anion, a thiocyanate anion, or a tetrakis[3,5-bis(trifluoromethyl)phenyl]borate anion. The inorganic acid anion is preferably a carbonate ion, a hydrogen carbonate ion, a tetrafluoroborate anion, or a hexafluorophosphate anion.

(Anion Exchange Electrolyte Membrane)

Generally, fluorine-based materials such as polytetrafluoroethylene and polyolefin-based materials such as polyethylene are often used as base materials for electrolyte membranes used, for example, in fuel cells.

An example of the method for introducing a polymerizable monomer having a graft monomer (M) to such a base material is a "pore filling polymerization method" in which pores of a microporous polymeric base material such as a polyolefin-based resin are filled with an electrolyte polymer formed from a polymerizable monomer. In this method, an organic solvent having both penetrability into the base material and hydrophilicity is used as a polymerizable monomer introducing agent. In an electrolyte membrane obtained by this method, however, the electrolyte polymer is not bound to the base material but is merely present in the pores of the base material. Therefore, the electrolyte polymer may leach from the pores during long-term operation.

In contrast, if a graft chain formed from a polymerized graft monomer (M) can be introduced to the surface of the polymeric base material, the graft chain is less likely to be detached from the polymeric base material in the resulting anion exchange electrolyte membrane. The present inventors have attempted to introduce a graft monomer (M) to an ultra-high molecular weight polyethylene membrane as a polymeric base material. However, no graft chain could be formed.

As a result of further studies, the present inventors have found that the use of a polymeric base material having a polar group makes it possible to introduce a graft chain formed from a polymerized graft monomer (M) to the polymeric base material and thus to obtain an anion exchange electrolyte membrane having a base polymer and a graft chain.

In the present embodiment, the base polymer contained in the anion exchange electrolyte membrane has a polar group. The polar group in the base polymer is preferably at least one functional group selected from the group consisting of a hydroxyl group, a carboxyl group, an ester group, an ether group, an amide group, and an amino group, and more preferably a hydroxyl group in view of its better alkali resistance and lower susceptibility to staining. These polar groups may be introduced into the base polymer by a polar group introduction treatment.

A commonly used technique, such as a corona treatment, a plasma treatment, or an UV treatment, may be used to introduce polar groups. Another method, for example, a method for introducing a polar group or a polymer having a polar group by a reaction with a radical formed by irradiation with a radiation such as an electron beam, may be used to introduce a polar group.

As the resin contained in the base polymer, any known resin may be used as long as the resin is insoluble in water and stable in an alkaline atmosphere and does not impair the effect of the present invention. Examples of the resin that may be contained in the base polymer include: polycarbonate resins; polyester resins such as polyethylene terephthalate; cellulose-based resins such as cellophane; polyvinyl acetal resins such as polyvinyl formal and polyvinyl butyral; polyamide resins such as nylon; (meth)acrylic resins; urea resins; phenol resins; melamine resins; epoxy resins; acetal resins (polyacetals); polyvinyl acetate resins; polyvinyl alcohol resins; ethylene-vinyl alcohol copolymers; hydrophilized polyolefin resins; and hydrophilized polystyrene resins. A hydrophilized polyolefin resin or a hydrophilized polystyrene resin may be a polyolefin resin having a polar group introduced therein by a hydrophilic treatment or a polystyrene resin having a polar group introduced therein by a hydrophilic treatment. The polar group is, for example, a hydroxyl group. It is preferable to use a polyvinyl alcohol resin, an ethylene-vinyl alcohol copolymer, or a hydrophilized polyolefin resin as the resin contained in the base polymer.

The resin contained in the base polymer may be crosslinked to reduce swelling of the resulting anion exchange electrolyte membrane. The method of crosslinking the resin is not particularly limited and any known method may be used as long as it does not inhibit the introduction of graft chains and can reduce the swelling of the base polymer. Examples of the crosslinking method include chemical crosslinking using a crosslinking agent and radiation crosslinking using radicals formed by irradiation with a radiation. One method may be used alone, or two or more methods may be used in combination.

In the present embodiment, it is preferable to use a polymeric base material having appropriate hydrophilicity. Preferably, the polymeric base material has a water content of more than 0.1%. The water content of the polymeric base material is more preferably in the range of more than 0.1% to 100% or less, even more preferably in the range of 1% or more and 80% or less, still even more preferably in the range of 2% or more and 60% or less, particularly preferably in the range of 4% or more and 40% or less, and most preferably in the range of 5% or more and 20% or less. The use of a polymeric base material having a water content as specified above makes it easier to introduce a graft monomer (M) and thus easier to introduce graft chains. The polymeric base material having a too low water content may cause difficulty in introducing graft chains. The polymeric base material having a too high water content may reduce the mechanical properties of the resulting anion exchange electrolyte membrane.

As used herein, the water content refers to the ratio of the difference between the weight of the wet polymeric base material and the weight of the dry polymeric base material to the weight of the dry polymeric base material. The weight of the dry polymeric base material is the value obtained by measuring the weight of the polymeric base material after being allowed to stand to dry in an atmosphere at 60° C. for at least 2 hours. The weight of the wet polymeric base material is the value obtained by measuring the weight of the polymeric base material after being dried as described above and then kept immersed in water maintained at 30° C. for at least 2 hours. Allowing the polymeric base material to stand to dry in an atmosphere at 60° C. for at least 2 hours means that the polymeric base material is dried until no further weight change is observed in the resulting polymeric base material. The standing time is 2 hours or longer. For example, the standing time may be 2 hours, or may be 3 hours or longer. The state in which no weight change is observed in the polymeric base material means, for example, that the difference between the weight $W_t$ of the polymeric base material after being allowed to stand to dry in an atmosphere at 60° C. for a predetermined time (t hours) of 2 hours or longer and the weight $W_{t+0.5}$ of the polymeric base material after being allowed to stand to dry in this atmosphere for another 30 minutes (t+0.5 hours) is within the range of ±0.5%. Keeping the polymeric base material immersed in water maintained at 30° C. for at least 2 hours means that no further weight change is observed in the polymeric base material when the state of the polymeric base material is evaluated based on the same criteria as described above.

The polymeric base material may contain a resin mentioned above as an example of the resin that may be contained in the base polymer.

When the resin contained in the polymeric base material contains an ethylene-vinyl alcohol copolymer, the ethylene content in the copolymer is preferably 1 to 99 mol %, and more preferably 20 to 50 mol %. If the ethylene content is too low, the resulting anion exchange electrolyte membrane may be readily soluble in water. If the ethylene content is too high, it may be difficult to introduce a graft monomer (M).

When the resin contained in the polymeric base material contains a polyvinyl alcohol resin, the saponification degree of the polyvinyl alcohol resin is preferably 70 mol % or more, and more preferably 98 mol % or more. If the saponification degree is too low, the resulting anion exchange electrolyte membrane may be readily soluble in water.

The thickness of the polymeric base material is not particularly limited, and it is, for example, in the range of 5 to 250 µm. In view of the strength of the membrane, the thickness of the polymeric base material is preferably in the range of 15 to 150 µm. The use of a polymeric base material having such a thickness makes it possible to obtain an anion exchange electrolyte membrane that has good membrane resistance, is less susceptible to damage, has good strength, and less susceptible to defects such as pinholes. The use of such a polymeric base material also makes it possible to reduce permeation of a fuel and an inorganic base (such as potassium hydroxide) added to the fuel.

The anion exchange electrolyte membrane of the present embodiment has a graft chain having a structural unit represented by the following formula (1) or (2). The structure represented by the formula (1) is a structure derived from a monomer represented by the formula (9). The structure represented by the formula (2) is a structure derived from a monomer represented by the formula (10).

(1)

(2)

$R^1$ to $R^6$ and $A^1$ are described above and therefore the description thereof is not repeated.

A counter anion is usually subjected to ion exchange with another anion before use, if necessary. Therefore, $X^1$ and $X^2$ are not particularly limited unless it is difficult to perform ion exchange, and known counter anions can be used. For example, $X^1$ and $X^2$ are each independently a halide ion, a hydroxide ion, or an organic or inorganic acid anion. Since a counter anion for use is typically a hydroxide ion, $X^1$ and $X^2$ are each preferably a hydroxide ion. In view of the storage stability of anion exchange groups, $X^1$ and $X^2$ are each preferably a halide ion or an organic acid anion. Examples of the halide ion include a fluoride ion, a chloride ion, a bromide ion, and an iodide ion. In view of good ion exchangeability, the halide ion is preferably a fluoride ion, a chloride ion, or a bromide ion. The organic acid anion is preferably a bis(trifluoromethanesulfonyl)imide anion, a thiocyanate anion, or a tetrakis[3,5-bis(trifluoromethyl)phenyl]borate anion. The inorganic acid anion is preferably a carbonate ion, a hydrogen carbonate ion, a tetrafluoroborate anion, or a hexafluoroborate anion.

Unlike benzyltrialkyl ammonium, the structure represented by the formula (1) or (2) has no benzylic position, and thus is less susceptible to $OH^-$-assisted nucleophilic substitution reaction in an alkaline atmosphere. In addition, a nitrogen atom is included in a ring structure in the structure represented by the formula (1) or (2), and thus an elimination reaction (E2 reaction) of a hydrogen atom at the β position to the nitrogen atom is less likely to occur. Therefore, an anion exchange group having the structure represented by the formula (1) or (2) has good alkali resistance, and thus a quaternary ammonium group in this structure is less susceptible to degradation even in a high-temperature atmosphere than in a benzyltrialkyl ammonium structure.

The graft chain may further has a structure derived from a monomer (graft comonomer) represented by any one of the following formulae (3) to (7):

Y is any one of structures given in the following formula (8).

In these formulae, $R^7$ to $R^{12}$ and $R^{15}$ to $R^{23}$ are each independently a hydrogen atom or an alkyl group having 1 to 8 carbon atoms. Preferably, $R^7$ to $R^{12}$, $R^{15}$, and $R^{16}$ are each independently a hydrogen atom or an alkyl group having 1 to 4 carbon atoms. $R^{13}$ and $R^{14}$ are each independently an alkyl group having 1 to 3 carbon atoms, and the total number of the carbon atoms in $R^{13}$ and the carbon atoms in $R^{14}$ is in a range of 2 to 6. Preferably, $R^7$ to $R^{23}$ are each independently a hydrogen atom or an alkyl group having 1 to 4 carbon atoms. $X^3$ to $X^6$ are each independently a halide ion, a hydroxide ion, or an organic or inorganic acid anion.

It is easier to introduce a crosslinked structure into a graft chain when the graft chain further contains a structure derived from the graft comonomer represented by the formula (3) or (4). As a result, this graft chain can contribute to improvement in the alkali resistance and heat resistance of the resulting anion exchange electrolyte membrane.

It is easier to control the hydrophilicity or hydrophobicity of a graft chain and the resulting anion exchange electrolyte membrane when the graft chain further contains a structure derived from the graft comonomer represented by any one of the formulae (5) to (7). When the graft chain contains a structure derived from one of these graft comonomers, the permeability of the resulting anion exchange electrolyte membrane can be controlled in some cases.

It is recommended that the grafting ratio of the anion exchange electrolyte membrane be in the range of 5 to 200%, for example. The ionic conductivity of the resulting anion exchange electrolyte membrane can be improved by increasing the grafting ratio.

A production method suitable for production of the anion exchange electrolyte membrane of the present invention is described.

Preferably, this production method includes a step of introducing a graft chain formed from polymerized polymerizable monomers to the polymeric base material. Preferably, the graft chain is formed by graft polymerization of the polymerizable monomers to the polymeric base material. Graft polymerization can be carried out by bringing the polymeric base material and the polymerizable monomers into contact with each other, for example.

The polymeric base material and the base polymer are described above and therefore the description thereof is not repeated.

The polymerizable monomers contain a monomer (graft monomer (M)) represented by the formula (9) or (10). The graft monomer (M) is described above and therefore the description thereof is not repeated. As the number of carbon atoms in $R^1$ to $R^6$ increases, the polarity of the graft monomer (M) decreases. As a result, the compatibility between the polymeric base material and the graft monomer (M) increases, which may make it easier to form graft chains. On the other hand, in view of the polymerizability of the graft monomer (M) and the number of anion exchange groups contained in the anion exchange electrolyte membrane per unit weight thereof, it is preferable that the number of carbon atoms in $R^1$ to $R^6$ be small.

Specific examples of the graft monomer (M) include diallyldimethylammonium chloride (DADMAC), diallyldimethylammonium bis(trifluoromethanesulfonyl)imide (DADMA-TFSI), and tetraallylammonium chloride (TAAC).

Since the graft monomer (M) contains an anion exchange group in its molecular structure, a step of adding an anion exchange group can be omitted in the present embodiment.

The polymerizable monomers may contain not only the graft monomer (M) but also at least one monomer (graft comonomer) selected from the group consisting of monomers represented by the formulae (3) to (7). The formulae (3) to (7) are described above and therefore the description thereof is not repeated.

The preferable content of the graft comonomer represented by the formula (3) or (4) cannot be definitely determined because it depends on the structure of the graft comonomer, the composition of the graft polymerization solution, the reaction temperature at which the graft polymerization should be carried out, and the environment in which the resulting anion exchange electrolyte membrane will be used. However, the content of the graft comonomer is, for example, 0.1 to 1000 parts by mass, and particularly 0.5 to 800 parts by mass, with respect to 100 parts by mass of the graft monomer (M).

The content of the graft comonomer represented by each of the formulae (5) to (7) cannot be definitely determined because it depends on the structure of the graft monomer or the graft comonomer, the composition of the graft polymerization solution, the reaction temperature at which the graft polymerization should be carried out, and the environment in which the resulting anion exchange electrolyte membrane will be used. However, the content of the graft comonomer is, for example, 1 to 5000 parts by mass, and particularly 50 to 2000 parts by mass, with respect to 100 parts by mass of the graft monomer (M).

The polymerizable monomers alone may be used for polymerization, or a solution (polymerizable monomer solution) obtained by dissolving the polymerizable monomers in a solvent may be prepared for polymerization.

Examples of the solvent used to dissolve the polymerizable monomers include: water; alcohols such as methanol, ethanol, and isopropanol; and polar aprotic solvents such as N,N-dimethylformamide (DMF), N,N-dimethylacetamide (DMAc), dimethyl sulfoxide (DMSO), and N-methylpyrrolidone (NMP). One of these solvents may be used alone, or two or more thereof may be used in combination.

The concentration of the polymerizable monomers contained in the polymerizable monomer solution may be determined depending on the polymerizability of the polymerizable monomers and the target grafting ratio. The concentration of the polymerizable monomers is, for example, 20 weight % or more. When the concentration of the polymerizable monomers is too low, the graft polymerization reaction may not proceed sufficiently.

In order to prevent the graft polymerization reaction from being inhibited by the presence of oxygen, it is preferable to purge oxygen from the polymerizable monomers or the polymerizable monomer solution by a known method such as freeze degassing or bubbling with nitrogen gas.

The reaction time of the graft polymerization is, for example, 10 minutes to 12 hours. The reaction temperature of the graft polymerization is, for example, 0 to 90° C., and particularly 40 to 80° C. It is possible to control the grafting ratio using these reaction temperature and reaction time.

Preferably, the production method suitable for production of the anion exchange electrolyte membrane of the present embodiment further includes a step of irradiating the polymeric base material with a radiation. That is, it is preferable that the production method include: a step of irradiating the polymeric base material with a radiation; and a step of introducing a graft chain formed from polymerized polymerizable monomers to the radiation-irradiated polymeric base material.

Ionizing radiations such as α rays, β rays, γ rays, electron beams, ultraviolet rays may be used as the radiation to be applied to the polymeric base material. It is particularly preferable to use γ rays or electron beams. The radiation dose is preferably in the range of 1 to 300 kGy, and more preferably in the range of 10 to 100 kGy. When the radiation dose is too low, the amount of radicals produced in the polymeric base material by irradiation with a radiation may be reduced, resulting in difficulty in initiating graft polymerization. When the radiation dose is too high, the polymeric base material may be decomposed by irradiation with a radiation, or too many radicals are produced by irradiation with a radiation, resulting in excessive polymerization reaction.

As an example of the graft polymerization reaction including a step of irradiating with a radiation, a solid-liquid two-phase reaction system is described. A polymerizable monomer solution is poured into a glass or stainless steel vessel. Vacuum degassing and inert gas (such as nitrogen) bubbling of the polymerizable monomer solution are performed to remove oxygen, which inhibits the graft reaction, from the solution. Next, the previously radiation-irradiated polymeric base material is put into the polymerizable monomer solution so as to allow graft polymerization to proceed. A graft chain formed by the polymerization of the polymerizable monomers is introduced to the polymeric base material to form a graft polymer, and then the graft polymer is removed from the solution. The graft polymer thus obtained is washed 2 to 6 times with a washing agent to remove the solvent, unreacted polymerizable monomers, and unintroduced polymerized polymerizable monomers. Any washing agent may be used for washing as long as the unreacted polymerizable monomers and the unintroduced polymerized polymerizable monomers are readily soluble but the polymeric base material and the graft polymer are insoluble in the washing agent. For example, acetone, methanol, ethanol, water, or the like may be used.

(MEA for Anion Exchange Membrane Fuel Cell)

The MEA of the present embodiment includes the anion exchange electrolyte membrane of the present invention and a catalyst layer disposed on the surface of the anion exchange electrolyte membrane.

Figure 1:
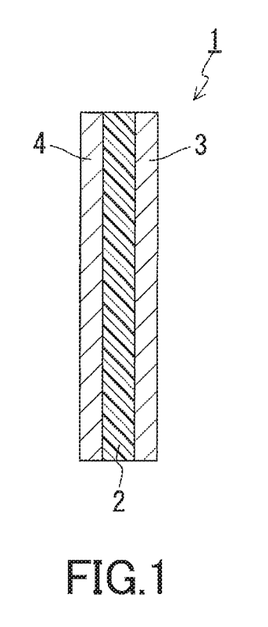
FIG. 1 is a cross-sectional view schematically showing an example of a MEA of the present invention.

In the MEA including the anion exchange electrolyte membrane of the present invention, a catalyst layer is disposed on the surface of the anion exchange electrolyte membrane. Typically, the anion exchange electrolyte membrane and the catalyst layer are joined together by a technique such as hot pressing. Usually, a pair of catalyst layers, that is, an anode catalyst layer and a cathode catalyst layer, are disposed on the principal surfaces of the anion exchange electrolyte membrane so as to sandwich the electrolyte membrane therebetween. FIG. 1 shows an example of a MEA including the anion exchange electrolyte membrane of the present invention. A MEA 1 shown in FIG. 1 includes an anion exchange electrolyte membrane 2, an anode electrode 3, and a cathode electrode 4. The anode electrode 3 is disposed on one principal surface of the anion exchange electrolyte membrane 2, and the cathode electrode 4 is disposed on the other principal surface of the anion exchange electrolyte membrane 2.

As these catalyst layers, catalyst layers included in known MEAs for use in anion exchange membrane fuel cells can be used. Unlike a cation exchange membrane fuel cell, an anion exchange membrane fuel cell does not necessarily need a noble metal catalyst such as platinum. For example, a base metal such as nickel, cobalt, iron, or silver can be used as a catalyst. The structure of the anode side (anode catalyst layer) of the MEA (for example, the specific catalyst contained therein) may be the same as or different from that of the cathode side (cathode catalyst layer) thereof.

(Anion Exchange Membrane Fuel Cell)

Figure 2:
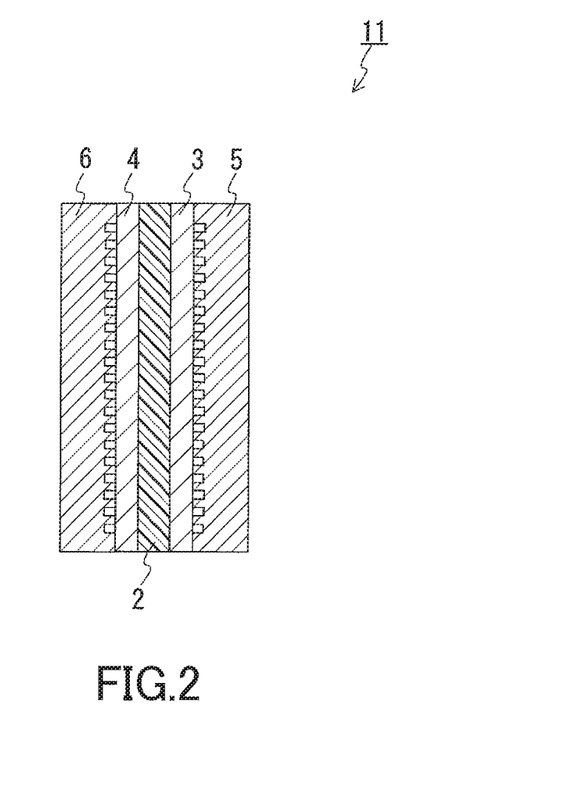
FIG. 2 is a cross-sectional view schematically showing an example of a fuel cell of the present invention.

The anion exchange membrane fuel cell of the present embodiment includes the MEA having the anion exchange electrolyte membrane of the present invention. FIG. 2 shows an example of the main part of the anion exchange membrane fuel cell of the present embodiment. An anion exchange membrane fuel cell 11 shown in FIG. 2 includes the anion exchange electrolyte membrane, a pair of electrodes (the anode electrode 3 and the cathode electrode 4) disposed on the electrolyte membrane so as to sandwich the electrolyte membrane therebetween, and a pair of separators (an anode separator 5 and a cathode separator 6) disposed on the pair of electrodes so as to sandwich the electrodes therebetween. These components are joined together under pressure applied in the direction perpendicular to the principal surfaces of the components. The anion exchange electrolyte membrane 2 and the electrodes 3 and 4 constitute the MEA.

In the anion exchange membrane fuel cell of the present embodiment, a fuel is supplied to the anode side and an oxidant is supplied to the cathode side. The fuel is, for example, an alkaline fuel containing an alcohol, a hydrazine (hydrate), or the like. The fuel preferably contains a hydrazine (hydrate) because hydrazine has high reactivity and produces no carbon dioxide through the process of power generation. The oxidant is, for example, oxygen in the air.

In the anion exchange membrane fuel cell of the present embodiment, an inorganic base such as potassium hydroxide may be added to the fuel to improve the cell reaction activity or to reduce poisoning caused by carbon dioxide or the like.

The anion exchange membrane fuel cell of the present embodiment has good alkali resistance, and even in the case of high-temperature operation, the fuel cell is less susceptible to performance degradation caused by degradation of the anion exchange electrolyte membrane.

The anion exchange membrane fuel cell of the present embodiment may include a member known as a member constituting an anion exchange membrane fuel cell in addition to the MEA of the present invention. When the fuel cell is a single cell, the member is a gas diffusion layer, a separator, or the like. When the fuel cell is a system, the member is a fuel supplier, an oxidant supplier, a humidifier, a current collector, a temperature sensor for detecting the power generation state, an oxygen sensor, a flowmeter, a humidity sensor, or the like.

EXAMPLES

Hereinafter, the present invention will be described in more detail with reference to the following examples. The present invention is not intended to be limited to these examples. In the following description, room temperature refers to 23° C.

In Examples and Comparative Example given below, the following abbreviations are used.
DADMAC: diallyldimethylammonium chloride
CMS: 4-chloromethylstyrene
EVOH: ethylene-vinyl alcohol copolymer
EVOH (44): ethylene-vinyl alcohol copolymer (containing 44 mol % of ethylene units)
EVOH (32): ethylene-vinyl alcohol copolymer (containing 32 mol % of ethylene units)
PVA: polyvinyl alcohol (saponification degree of 98 mol %)
UHMWPE: ultra-high molecular weight polyethylene In Examples and Comparative Examples, the physical properties were measured by the following methods.

(Water Content in Polymeric Base Material)

A polymeric base material was allowed to stand in a drying oven at 60° C. for at least 2 hours to dry the base material until no further weight change was observed, and then cooled in a desiccator. The cooled polymeric base material was removed from the desiccator, immediately after which the weight of the base material was measured and used as the weight of the dry polymeric base material. After the weight of the dry polymeric base material was measured, the base material was kept immersed in water maintained at 30° C. for at least 2 hours until no further weight change was observed and then removed from the water. The surface of the polymeric base material was wiped with filter paper to remove excess water, and then the weight of the resulting polymeric base material was measured to obtain the weight of the wet polymeric base material. The water content refers to the ratio of the difference between the weight of the wet polymeric base material and the weight of the dry polymeric base material to the weight of the dry polymeric base material.

(Ion Exchange Capacity)

An anion exchange electrolyte membrane was immersed in a 3 mol/L (23° C.) saline solution for at least 10 hours, so that counter anions in the anion exchange electrolyte membrane were replaced by chloride ions. Then, this anion exchange electrolyte membrane was immersed in a 1 mol/L aqueous sodium nitrate ($NaNO_3$) solution for at least 12 hours. Free chloride ions were titrated with a 0.05 mol/L aqueous silver nitrate ($AgNO_3$) solution to measure the ion exchange capacity.

(Durability Test)

A 5 cm-square sample of an anion exchange electrolyte membrane was prepared. The sample was immersed in 100 mL of a 1 mol/L aqueous potassium hydroxide solution in a polytetrafluoroethylene vessel and then allowed to stand in an atmosphere at 80° C. After a predetermined time, the membrane sample was removed from the atmosphere and washed with pure water two or more times, and then the ion exchange capacity thereof was measured. The ion exchange capacity thus measured was used as the ion exchange capacity after the durability test. The ratio of the ion exchange capacity of the anion exchange electrolyte membrane after the durability test to the ion exchange capacity thereof before the durability test (initial value of the ion exchange capacity) was used as a measure of the durability test.

(Grafting Ratio)

The grafting ratio was calculated by the following equation:

Grafting ratio (%)=100×($W_1$−$W_0$)/$W_0$, where $W_0$ is the weight (g) of the dry polymeric base material prepared before graft polymerization, and $W_1$ is the weight (g) of the dry graft polymer obtained after graft polymerization. The "weight of a dry sample" refers to a value obtained by allowing the sample to stand in an atmosphere at 60° C. for at least 2 hours until no further weight change is observed.

Example 1

EVOH (44) was used as a polymeric base material. This polymeric base material was irradiated with an electron beam at 90 kGy at room temperature in a vacuum. This polymeric base material was stored in an atmosphere at −60° C. and then cut into 5-cm-square pieces before graft polymerization was carried out. An aqueous solution containing 60 weight % of DADMAC as a graft monomer (M) was prepared. Oxygen in this aqueous solution was purged with nitrogen gas. The electron beam-irradiated EVOH (44) was immersed in this aqueous solution, and the temperature of the aqueous solution was maintained at 70° C. (graft polymerization temperature) for 5 hours so as to allow graft polymerization to proceed. Then, the resulting graft-polymerized membrane was removed from the aqueous solution. A process of immersing the membrane in water for at least 1 hour and then washing it was repeated several times. The washed membrane was placed in a drying oven and dried in an atmosphere at 60° C. for at least 2 hours. Thus, a DADMAC-graft-polymerized EVOH (44) membrane was obtained. The grafting ratio of the grafted membrane thus obtained was 20%.

Example 2

A grafted membrane was obtained in the same manner as in Example 1, except that EVOH (32) was used as a polymeric base material. The grafting ratio of the grafted membrane (EVOH (32)-g-DADMAC) thus obtained was 36%.

Example 3

A grafted membrane was obtained in the same manner as in Example 2, except that polymerization time for graft polymerization was 6 hours. The grafting ratio of the grafted membrane (EVOH (32)-g-DADMAC) thus obtained was 43%.

Example 4

A polymeric base material EVOH (44) was irradiated with an electron beam at 90 kGy and then cut into rectangular pieces with a short side of 9.5 cm and a long side of 20 cm. A grafted membrane was obtained in the same manner as in Example 1, except that this polymeric base material was used and the polymerization temperature was 60° C. The grafting ratio of the grafted membrane (EVOH (44)-g-DADMAC) thus obtained was 21%.

Example 5

A grafted membrane was obtained in the same manner as in Example 4, except that EVOH (32) was used as a polymeric base material. The grafting ratio of the grafted membrane (EVOH (32)-g-DADMAC) thus obtained was 34%.

Example 6

A polymeric base material EVOH (44) was irradiated with an electron beam at 90 kGy and then cut into rectangular pieces with a short side of 8 cm and a long side of 10 cm. A grafted membrane was obtained in the same manner as in Example 1, except that this polymeric base material was used and the polymerization temperature was 50° C. The grafting ratio of the grafted membrane (EVOH (44)-g-DADMAC) thus obtained was 18%.

Example 7

A grafted membrane was obtained in the same manner as in Example 6, except that EVOH (32) was used as a polymeric base material. The grafting ratio of the grafted membrane (EVOH (32)-g-DADMAC) thus obtained was 28%.

Example 8

A grafted membrane was obtained in the same manner as in Example 1, except that PVA was used as a polymeric base material and the polymerization time was 3 hours. The grafting ratio of the grafted membrane (PVA-g-DADMAC) thus obtained was 25%.

Comparative Example 1

UHMWPE was used as a base material, and this base material was irradiated with an electron beam at 90 kGy at room temperature in a vacuum. The electron beam-irradiated UHMWPE was stored in an atmosphere at −60° C. and then cut into 5-cm-square pieces before graft polymerization was carried out.

An aqueous solution containing 60 weight % of DADMAC (monomer) was prepared, and oxygen in this aqueous solution was purged with nitrogen gas. The electron beam-irradiated UHMWPE was immersed in this solution, and the temperature of the aqueous solution was maintained at 70° C. (graft polymerization temperature) for 5 hours so as to allow graft polymerization to proceed. Then, the resulting graft-polymerized membrane was removed from the aqueous solution. A process of immersing the membrane in water for at least 1 hour and then washing it was repeated several times. The washed membrane was placed in a drying oven and dried in an atmosphere at 60° C. for at least 2 hours. The grafting ratio of the membrane thus obtained was 0%.

Comparative Example 2

Graft polymerization was carried out in the same manner as in Comparative Example 1, except that CMS (purity of 100%) was used as a monomer and the polymerization time was 0.5 hour. The grafting ratio of the grafted membrane thus obtained was 96%.

Table 1 collectively shows the conditions for graft polymerization and the grafting ratios, and Table 2 collectively shows the results of the durability test of the obtained electrolyte membranes.

TABLE 1

| | Polymeric base material | | | Conditions for graft polymerization | | | | |
|---|---|---|---|---|---|---|---|---|
| | Resin | Thickness [μm] | Water content [%] | Monomer | Solvent composition | Polymerization temperature [° C.] | Polymerization time [h] | Grafting ratio [%] |
| Ex. 1 | EVOH(44) | 20 | 8 | DADMAC | 60% in $H_2O$ | 70 | 5 | 20 |
| Ex. 2 | EVOH(32) | 20 | 10 | DADMAC | 60% in $H_2O$ | 70 | 5 | 36 |
| Ex. 3 | EVOH(32) | 20 | 10 | DADMAC | 60% in $H_2O$ | 70 | 6 | 43 |
| Ex. 4 | EVOH(44) | 20 | 8 | DADMAC | 60% in $H_2O$ | 60 | 5 | 21 |
| Ex. 5 | EVOH(32) | 20 | 10 | DADMAC | 60% in $H_2O$ | 60 | 5 | 34 |
| Ex. 6 | EVOH(44) | 20 | 8 | DADMAC | 60% in $H_2O$ | 50 | 5 | 18 |
| Ex. 7 | EVOH(32) | 20 | 10 | DADMAC | 60% in $H_2O$ | 50 | 5 | 28 |
| Ex. 8 | PVA | 30 | 50 | DADMAC | 60% in $H_2O$ | 70 | 3 | 25 |
| Com. Ex. 1 | UHMWPE | 25 | <0.1 | DADMAC | 60% in $H_2O$ | 70 | 5 | 0 |
| Com. Ex. 2 | UHMWPE | 25 | <0.1 | CMS | Neat | 70 | 0.5 | 96 |

TABLE 2

| Grafted membrane | Durability test time | | | |
|---|---|---|---|---|
| | 0 hour | 500 hours | 1000 hours | 2000 hours |
| Ex. 1 | 100% | 103% | 101% | 100% |
| Ex. 2 | 100% | 100% | 101% | 97% |
| Ex. 3 | 100% | 101% | 96% | 101% |
| Ex. 4 | 100% | 99% | 103% | 102% |
| Ex. 5 | 100% | 97% | 105% | 96% |
| Ex. 6 | 100% | 100% | 95% | 98% |
| Ex. 7 | 100% | 98% | 100% | 102% |
| Ex. 8 | 100% | 97% | 94% | 97% |
| Com. Ex. 2 | 100% | 85% | 79% | 74% |

It can be concluded from these results that in Comparative Example 1, the base material having a low water content could not be sufficiently impregnated with a highly hydrophilic monomer DADMAC and thus graft polymerization did not proceed therein.

The invention claimed is:

1. An anion exchange electrolyte membrane comprising:
a base polymer comprising a polar group; and
a graft chain comprising a structural unit represented by the following formula (1) or (2):

where $R^1$ to $R^6$ are each independently a hydrogen atom or an alkyl group having 1 to 8 carbon atoms, a structure $A^1$ that forms a ring structure together with a nitrogen atom bonded thereto is a saturated carbon chain having 3 to 7 carbon atoms or a structure in which at least one of the carbon atoms of the saturated carbon chain is substituted by a hetero atom, and $X^1$ and $X^2$ are each independently a halide ion, a hydroxide ion, or an organic or inorganic acid anion.

2. The anion exchange electrolyte membrane according to claim 1, wherein the graft chain further comprises a structure derived from a monomer represented by any one of the following formulae (3) to (7):

where $R^7$ to $R^{12}$ and $R^{15}$ to $R^{21}$ are each independently a hydrogen atom or an alkyl group having 1 to 8 carbon atoms, $R^{13}$ and $R^{14}$ are each independently an alkylene group having 1 to 3 carbon atoms, a total number of the carbon atoms in $R^{13}$ and the carbon atoms in $R^{14}$ is in a range of 2 to 6, $X^3$ to $X^5$ are each independently a halide ion, a hydroxide ion, or an organic or inorganic acid anion, and Y is any one of structures given in the following formula (8):

where $R^{22}$ and $R^{23}$ are each independently a hydrogen atom or an alkyl group having 1 to 8 carbon atoms, and $X^6$ is a halide ion, a hydroxide ion, or an organic or inorganic acid anion.

3. The anion exchange electrolyte membrane according to claim 1, wherein the polar group is at least one selected from the group consisting of a hydroxyl group, a carboxyl group, an ester group, an ether group, an amide group, and an amino group.

4. The anion exchange electrolyte membrane according to claim 1, wherein the base polymer comprises at least one selected from the group consisting of polycarbonate resins, polyester resins, cellulose-based resins, polyvinyl acetal resins, polyamide resins, (meth)acrylic resins, urea resins, phenol resins, melamine resins, epoxy resins, acetal resins, polyvinyl acetate resins, polyvinyl alcohol resins, ethylene-vinyl alcohol copolymers, hydrophilized polyolefin resins, and hydrophilized polystyrene resins.

5. A membrane-electrode assembly for an anion exchange membrane fuel cell, comprising the anion exchange electrolyte membrane according to claim 1.

6. An anion exchange membrane fuel cell comprising the membrane-electrode assembly for an anion exchange membrane fuel cell according to claim 5.

* * * * *